United States Patent
Kumar et al.

(10) Patent No.: US 10,036,527 B2
(45) Date of Patent: *Jul. 31, 2018

(54) VEHICULAR LIGHT GUIDES AND ASSEMBLIES WITH UNIFORM ILLUMINATION

(71) Applicant: Ford Global Technologies, LLC, Dearborn, MI (US)

(72) Inventors: Arun Kumar, Farmington Hills, MI (US); Mahendra Somasara Dassanayake, Bllomfield Hills, MI (US); Steve Darrell Miller, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,475

(22) Filed: Sep. 6, 2016

(65) Prior Publication Data

US 2016/0369968 A1 Dec. 22, 2016

Related U.S. Application Data

(63) Continuation of application No. 13/736,395, filed on Jan. 8, 2013, now Pat. No. 9,464,785.

(51) Int. Cl.
*F21V 7/00* (2006.01)
*F21S 8/10* (2006.01)
(Continued)

(52) U.S. Cl.
CPC ............ *F21S 48/2237* (2013.01); *B60Q 1/00* (2013.01); *B60Q 1/0041* (2013.01); *B60Q 1/30* (2013.01); *F21S 43/14* (2018.01); *F21S 43/237* (2018.01); *F21S 43/26* (2018.01); *F21S 43/30* (2018.01); *F21S 43/315* (2018.01); *F21S 43/40* (2018.01); *F21V 5/04* (2013.01); *F21V 13/04* (2013.01);
(Continued)

(58) Field of Classification Search
CPC .............................. G02B 6/0096; F21K 9/62
See application file for complete search history.

(56) References Cited

U.S. PATENT DOCUMENTS

| | | |
|---|---|---|
| 4,225,906 A | 9/1980 | Gulliksen et al. |
| 5,023,758 A | 6/1991 | Allen et al. |

(Continued)

FOREIGN PATENT DOCUMENTS

JP  8212804 A  8/1996

*Primary Examiner* — Sean Gramling
(74) *Attorney, Agent, or Firm* — Jason Rogers; Price Heneveld LLP (57) ABSTRACT

A light guide is provided that includes a light chamber defined by isotropically luminant top, bottom, and back surfaces, and a front surface having a translucent lens. The light guide also includes a reflective diaphragm within the chamber that defines a top gap between the diaphragm and the top surface, and a bottom gap between the diaphragm and the bottom surface. The light guide further includes an LED light source located between the diaphragm and the back surface of the chamber. The light guide may also be configured with a front surface having a partially transmissive lens and no reflective diaphragm. A vehicle lighting assembly is also provided that includes a plurality of interconnected light chamber sections comprising light guides.

13 Claims, 5 Drawing Sheets

(51) Int. Cl.
  *B60Q 1/00*     (2006.01)
  *F21V 5/04*     (2006.01)
  *F21V 13/04*    (2006.01)
  *B60Q 1/30*     (2006.01)
  *F21S 43/14*    (2018.01)
  *F21S 43/20*    (2018.01)
  *F21S 43/237*   (2018.01)
  *F21S 43/30*    (2018.01)
  *F21S 43/31*    (2018.01)
  *F21S 43/40*    (2018.01)
  *F21V 8/00*     (2006.01)
  *F21Y 101/00*   (2016.01)
  *F21Y 115/10*   (2016.01)
  *F21W 103/00*   (2018.01)

(52) U.S. Cl.
  CPC ...... *F21V 2200/40* (2015.01); *F21W 2103/00* (2018.01); *F21Y 2101/00* (2013.01); *F21Y 2115/10* (2016.08); *G02B 6/0051* (2013.01)

(56) References Cited

U.S. PATENT DOCUMENTS

| | | |
|---|---|---|
| 5,842,776 A | 12/1998 | Shigemura et al. |
| 6,062,710 A | 5/2000 | Hewitt |
| 6,095,673 A | 8/2000 | Goto et al. |
| 6,527,410 B2 | 3/2003 | Yamaguchi |
| 6,543,923 B2 | 4/2003 | Tamai |
| 6,637,923 B2 | 10/2003 | Amano |
| 6,886,967 B2 | 5/2005 | Quang |
| 7,350,947 B2 | 4/2008 | Reading |
| 7,399,106 B2 | 7/2008 | Reading |
| 9,464,785 B2 * | 10/2016 | Kumar .................. B60Q 1/00 |
| 2001/0021110 A1 | 9/2001 | Nakayama et al. |
| 2004/0196667 A1 | 10/2004 | Lea |
| 2004/0257790 A1 | 12/2004 | Tanaka et al. |
| 2005/0138852 A1* | 6/2005 | Yamauchi ................ F21V 7/10 |
| | | 40/582 |
| 2005/0280785 A1 | 12/2005 | Beeson et al. |
| 2007/0030688 A1 | 2/2007 | Amano et al. |
| 2007/0091613 A1 | 4/2007 | Lee et al. |
| 2008/0074901 A1 | 3/2008 | David et al. |
| 2008/0232127 A1 | 9/2008 | Futami |
| 2009/0003002 A1 | 1/2009 | Sato |
| 2010/0195342 A1 | 8/2010 | Lambert et al. |
| 2011/0317442 A1 | 12/2011 | Makiuchi |
| 2012/0057363 A1 | 3/2012 | Ishida et al. |
| 2012/0075849 A1 | 3/2012 | Potter |
| 2012/0120672 A1 | 5/2012 | Stagg et al. |
| 2012/0268940 A1 | 10/2012 | Sahlin et al. |
| 2012/0281407 A1 | 11/2012 | Sinofsky |
| 2013/0265791 A1* | 10/2013 | Dassanayake ........ F21S 48/215 |
| | | 362/520 |
| 2015/0000305 A1 | 1/2015 | Jasklowski |

* cited by examiner

VEHICULAR LIGHT GUIDES AND ASSEMBLIES WITH UNIFORM ILLUMINATION

CROSS-REFERENCE TO RELATED APPLICATION

This application is a continuation application that claims priority to and the benefit under 35 U.S.C. § 120 of U.S. patent application Ser. No. 13/736,395, filed on Jan. 8, 2013, entitled "VEHICULAR LIGHT GUIDES AND ASSEMBLIES WITH UNIFORM ILLUMINATION," and now issued as U.S. Pat. No. 9,464,785, the entire disclosure of which is incorporated by reference herein.

FIELD OF THE INVENTION

The present invention generally relates to light chambers providing uniform illumination and, more particularly, to air-filled, vehicular light chambers illuminated by LED light sources.

BACKGROUND OF THE INVENTION

Light pipes and light guides have been used to illuminate a large area for styling and other functions. These light guides and pipes usually possess thick walls. Accordingly, manufacturing these components is difficult. As such, light pipes have limited design and shape flexibility, particularly for large applications. In addition, most light pipe designs exhibit hot spots and thus do not produce highly uniform light distributions.

Accordingly, there is a need for light pipes and guides that exhibit a high degree of light uniformity while offering significant manufacturing and design flexibility.

SUMMARY OF THE INVENTION

One aspect of the present invention is to provide a light guide that includes a light chamber defined by isotropically luminant top, bottom, and back surfaces, and a front surface having a translucent lens. The light guide also includes a reflective diaphragm within the chamber that defines a top gap between the diaphragm and the top surface, and a bottom gap between the diaphragm and the bottom surface. The light guide further includes an LED light source located between the diaphragm and the back surface of the chamber.

Another aspect of the present invention is to provide a light guide that includes a light chamber defined by isotropically luminant top, bottom, and back surfaces, and a front surface having a partially transmissive lens. The light guide also includes an LED light source within the chamber. Further, the partially transmissive lens has a transmissivity of approximately 15 to 40% of the sum of incident light from the LED light source and the light scattered from the isotropically luminant surfaces.

A further aspect of the present invention is to provide a vehicle lighting assembly that includes a plurality of interconnected light chamber sections, each section defined by a front surface having a lens element, and isotropically luminant top, bottom, and back surfaces. The vehicle lighting assembly also includes an LED light source within each section. In addition, each LED light source emanates light that scatters off of the isotropically luminant surfaces and exits the sections through the lens elements.

An additional aspect of the present invention is to provide a light guide that includes: a chamber comprising opposed ends, isotropic light-scattering upper and lower interior surfaces and a front lens; a reflective diaphragm within the chamber spaced from the lens and both of the surfaces; and an LED light source within the chamber, spaced behind the diaphragm at an end. A ratio of gaps between the diaphragm and the surfaces to a distance between the surfaces is 1:4 to 1:9.

Another aspect of the present invention is to provide a light guide that includes: a chamber comprising isotropic light-scattering upper and lower interior surfaces and a front lens; a reflective diaphragm within the chamber spaced from the lens and both of the surfaces; and an LED light source within the chamber, spaced behind the diaphragm. A ratio of gaps between the diaphragm and the surfaces to a distance between the surfaces is 1:4 to 1:9.

A further aspect of the present invention is to provide a light guide that includes: a cylindrical chamber defined by opposed ends, isotropic light-scattering interior surfaces and a front lens; a reflective diaphragm within the chamber spaced from the lens and portions of the interior surfaces near the lens; and an LED light source within the chamber, spaced behind the diaphragm. A ratio of gaps between the diaphragm and the portions to a distance between the portions is 1:4 to 1:9.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
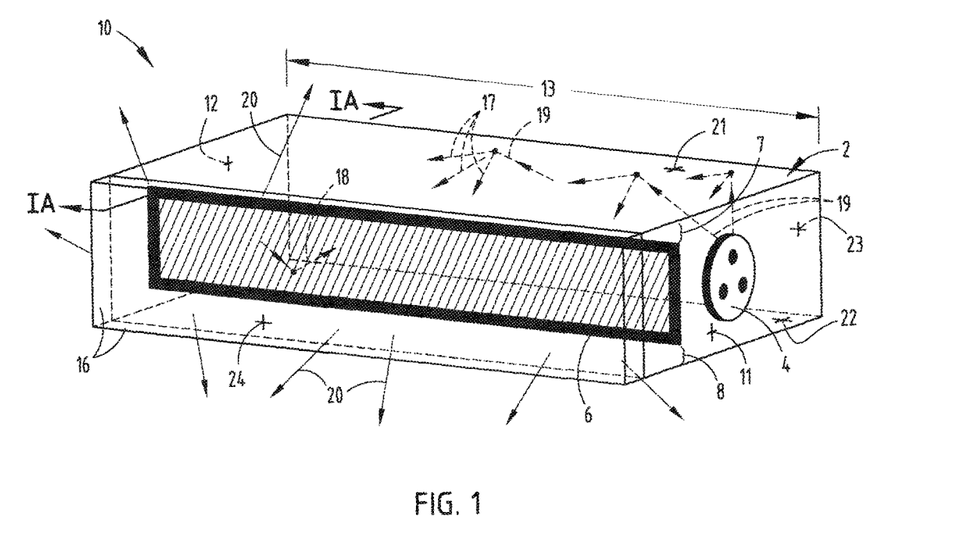
FIG. 1 is a perspective view of a light guide having a light chamber that is illuminated with an LED light source, is defined by isotropically luminant surfaces, and includes a reflective diaphragm and a translucent lens according to one aspect of the disclosure.

For purposes of description herein, the terms "upper," "lower," "right," "left," "rear," "front," "vertical," "horizontal," and derivatives thereof shall relate to the invention as oriented in FIG. 1. However, the invention may assume various alternative orientations, except where expressly specified to the contrary. Also, the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
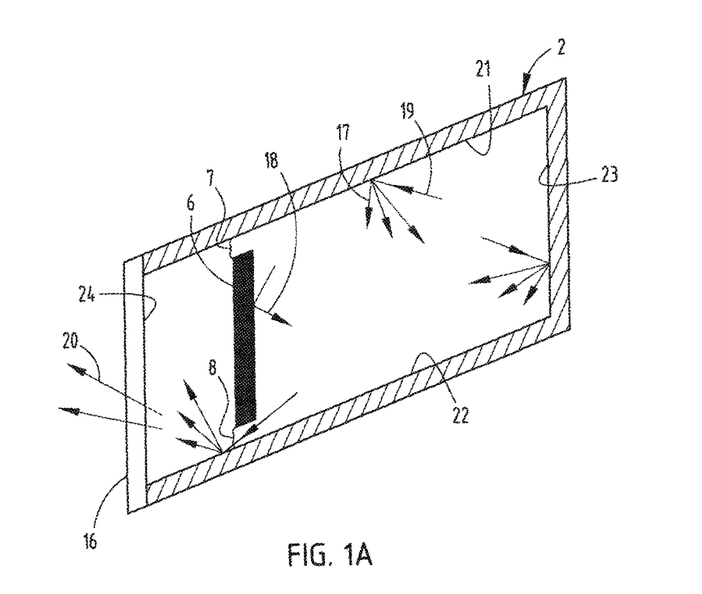
FIG. 1A is a cross-sectional view of the light guide depicted in FIG. 1 at line IA-IA.

As depicted in FIGS. 1 and 1A, a light guide 10 is arranged to provide uniform illumination for various lighting applications according to one aspect of the disclosure. Light guide 10 includes a light chamber 2 that is defined by isotropically luminant, internal surfaces—top surface 21, bottom surface 22, and back surface 23. The light chamber 2 is also defined by a front surface 24 having a translucent lens 16. Lens 16 should be substantially translucent over a large spectrum. Light chamber 2 can be further defined by a chamber length 13, spanning the longest axis of the chamber, and a right end 11 and a left end 12.

Light guide 10 further includes a reflective diaphragm 6, arranged within light chamber 2. In particular, reflective diaphragm 6 is arranged within the chamber such that it defines a top gap 7 between its top edge and top surface 21. Further, reflective diaphragm 6 is arranged within the chamber such that it also defines a bottom gap 8 between its bottom edge and bottom surface 22. Accordingly, there is a pair of gaps within chamber 2, one on each side of reflective diaphragm 6.

Light guide 10 also includes an LED light source 4, arranged within light chamber 2 to emanate incident light 19 within the chamber. In particular. LED light source 4 is located between the reflective diaphragm 6 and the back surface 23. LED light source 4 can be arranged at one end of light chamber 2 (right end 11 or left end 12) and oriented to direct incident light 19 toward the other end of the chamber 2. As shown in FIG. 1, light source 4 is located at the left end 12 of chamber 2 and oriented to emanate incident light 19 toward the right end 11.

Figure 1B:
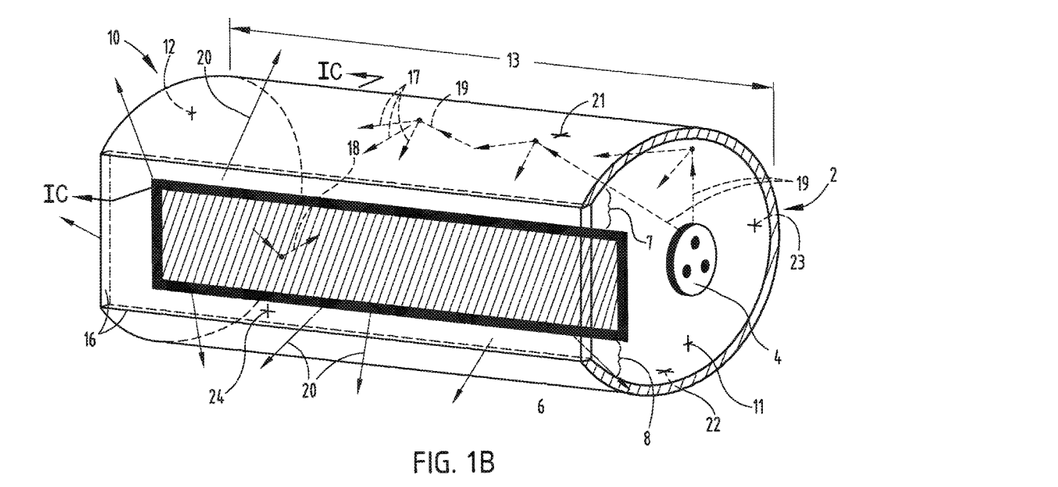
FIG. 1B is a perspective view of a light guide having a light chamber in the shape of a long cylinder with opposed ends that is illuminated with an LED light, is defined by isotropically luminant surfaces, and includes a reflective diaphragm and a translucent lens, according to an aspect of the disclosure.
Figure 1C:
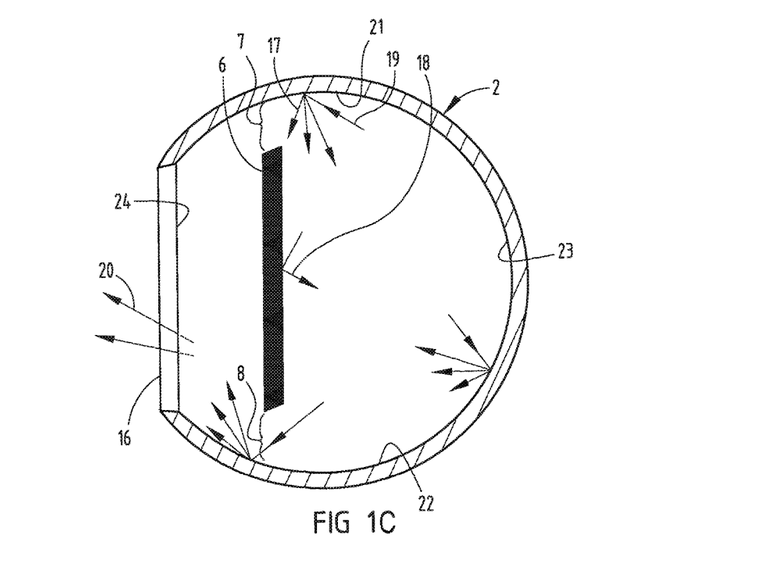
FIG. 1C is a cross-sectional view of the light guide depicted in FIG. 1B at line IC-IC.

Light chamber 2 can be defined by a substantially constant cross-sectional area across its length 13. Light chamber 2 may also be arranged in the shape of a rectangular cuboid having a pair of opposed, parallel ends, e.g., right end 11 and left end 12 (as shown in FIGS. 1 and 1A). Nevertheless, other shapes for light chamber 2 are viable, provided that they have sufficient space to enclose light source 4 and reflective diaphragm 6. For example, light chamber 2 may be configured in the shape of a long cylinder with opposed, parallel ends (as shown in FIGS. 1B and 1C). In this cylindrical configuration, the front surface 24 of chamber 2 may be a flat, faceted surface on the cylinder. This flat surface may then contain the translucent lens 16, acting as a "window" for the cylindrically-shaped chamber 2. Similarly, the remaining surface or surfaces within the chamber 2, arranged in a cylindrical shape, are defined by isotropically luminant surfaces (i.e., isotropically luminant surfaces 21, 22 and 23 as also shown in FIGS. 1B and 1C). In other configurations for light chamber 2, the cross-sectional area across the length 13 of the chamber 2 may vary continuously, or in a few or many discrete steps. Accordingly, chamber 2 may possess many varieties of shapes, tailored to the final application.

Light chamber 2 can also enclose a substantially gaseous medium, for example, ambient air. Other gaseous media may also be employed within chamber 2. For example, mixtures of nitrogen, argon, helium, and/or oxygen gas are feasible. Various mixtures, pressures and volumes of the gaseous medium within chamber 2 may be selected to produce particular illumination effects, including colors, from the LED light source 4.

Isotropically luminant surfaces 21 (top), 22 (bottom), and 23 (back) within chamber 2 are arranged to provide scattered light 17 from the incident light 19 from LED light source 4. In particular, incident light 19 strikes the isotropically luminant surfaces 21, 22 and 23 and scatters in all directions (i.e., 180 degrees). Various materials as known in this light guide field may be used for surfaces 21, 22 and 23 to produce this effect. For example, materials can be chosen for these surfaces 21, 22, and 23 with 96% or greater reflectance. White matte paints, for instance, may be used for the isotropically luminant surfaces 21, 22 and 23 to ensure isotropic scattering of incident light 19. Tinted, polymeric materials may also be suitable for use as isotropically luminant surfaces 21, 22 and 23. Consequently, incident light 19 that strikes these isotropically luminant surfaces within chamber 2 continues to scatter and propagate within chamber 2 along its length 13.

Reflective diaphragm 6 may be fabricated from a variety of known materials to produce a surface that substantially reflects incident light 19 and scattered light rays 17. For example, diaphragm 6 may be a mirror-like element fabricated from metal constituents. Accordingly, the materials employed for reflective diaphragm 6 should be characterized by a high optical reflectivity and/or coated, painted, sputtered or given a surface-treatment with such materials. For example, aluminum and/or silver-containing coatings can be used to fabricate diaphragm 6. As such, light rays 17 and 19 that strike reflective diaphragm 6 continue to propagate within chamber 2 as reflected light rays 18. Preferably, the thickness of diaphragm 6 is small relative to the overall distance from the back surface 23 and front surface 24 within chamber 2.

It is also preferable to locate the reflective diaphragm 6 in closer proximity to translucent lens 16 than back surface 23. For example, reflective diaphragm 6 can be located in proximity to the lens 16, about one third of the distance between lens 16 and the back surface 23. In addition, diaphragm 6 can be oriented such that its primary surfaces (i.e., its largest faces) are parallel to back and front surfaces 23 and 24, respectively (see FIGS. 1 and 1A).

It is also preferable to control the dimensions of the top and bottom gaps 7 and 8 between diaphragm 6 and top and bottom surfaces 21 and 22, respectively. One approach is to arrange the gaps 7 and 8 such that their total length relative to the distance between top and bottom surfaces 21 and 22 exists at a ratio in the range of approximately 1:4 to 1:9. For example, this ratio is 1:4 when the top and bottom gaps are each set at 0.5 cm and the distance between the top and bottom surfaces 21 and 22 is 4 cm. It is also preferable to control the size of gaps 7 and 8 such they are roughly equal to one another.

Various known LED technologies can be employed for LED light source 4. A wide range of light outputs and power densities are available for use as light source 4. Also, certain LED technologies can be employed for the LED light source 4 to produce incident light rays 19 with particular, desired colors. Alternatively, lens 16 can be tinted or modified with a color filter such that the transmitted light rays 20 that pass through it (as described in further detail below) appear with a desired color and/or aesthetic appearance in viewing from outside of light chamber 2.

As depicted in FIGS. 1 and 1A, light guide 10 operates to produce a substantially uniform transmitted light pattern over the length 13 of the chamber 2. In particular, LED light source 4 produces incident light rays 19 within the chamber 2. A portion of these incident light rays 19 strike reflective diaphragm 6, and continue to propagate within chamber 2 as reflected light rays 18. Another portion of the incident light rays 19 strike the isotropically luminant surfaces 21, 22 and 23 within chamber 2. These light rays 19 are then scattered in all (or nearly all) directions from these surfaces 21, 22 and 23 as scattered light rays 17. In turn, many of these scattered light rays 17 are reflected off of reflective diaphragm 6 as reflected light rays 18. Ultimately, incident light rays 19, reflected light rays 18, and scattered light rays 17 pass and/or leak through gaps 7 and 8 along the edge of reflective diaphragm 6. These "leaked" rays then pass out of lens 16 along the length 13 of the chamber 2 as transmitted light rays 20. Together, all of the transmitted light rays 20 that leak through the gaps 7 and 8 along the length 13, and exit the chamber through lens 16, create a highly uniform light pattern emanating from light guide 10.

Many factors affect the degree of uniformity and intensity of the transmitted light rays 20 that form the substantially uniform, transmitted light pattern from guide 10. These factors include: the choice of LED light source for source 4, the number of LED light sources 4 within chamber 2, the size of gaps 7 and 8, location of diaphragm 6 relative to the lens 16 and back surface 23, cross-sectional area within the chamber 2, and location and orientation of the LED light source 4 within chamber 2. For example, reducing the size of the gaps 7 and 8 to levels that approach a total gap to overall chamber thickness (i.e., the distance between the lens 16 and back surface 23) ratio of 1:9 can have the effect of producing a very uniform set of transmitted light rays 20 that exit lens 16. This is because the portion of incident light rays 19 that directly pass through the gaps 7 and 8 is small relative to the amount of light that scatters, propagates and reflects within chamber 2 off of the isotropically luminant surfaces 21, 22, and 23, along with the reflective diaphragm 6. On the other hand, configuring gaps 7 and 8 with a smaller size tends to lead to additional light scattering within chamber 2, reducing the overall light production efficiency of the guide 10. This is particularly the case for small gap sizes with total gap (i.e., total distance of gaps 7 and 8) to overall chamber thickness ratios well below 1:9.

Figure 2:
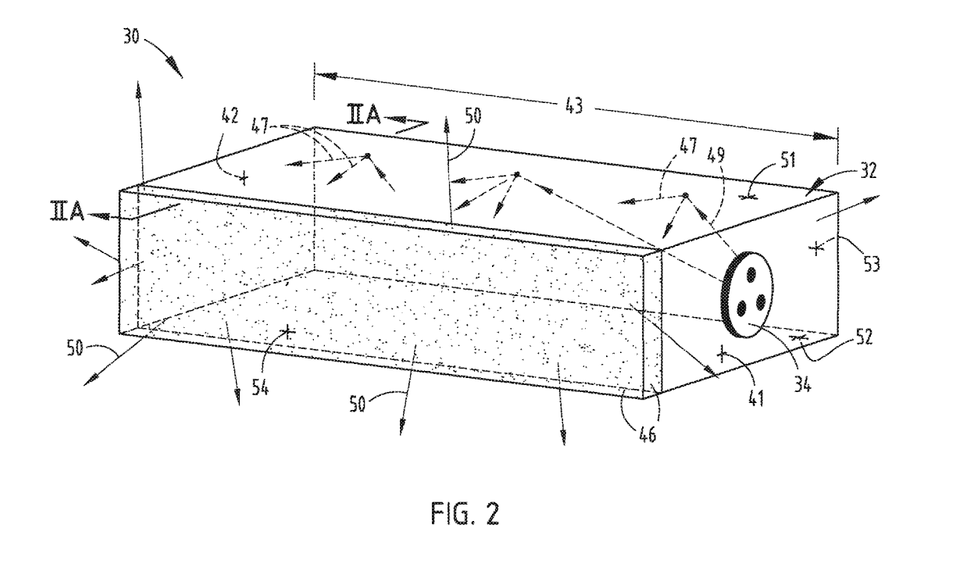
FIG. 2 is a perspective view of a light guide having a light chamber that is illuminated with an LED light source, is defined by isotropically luminant surfaces, and includes a partially transmissive lens according to another aspect of the disclosure.
Figure 2A:
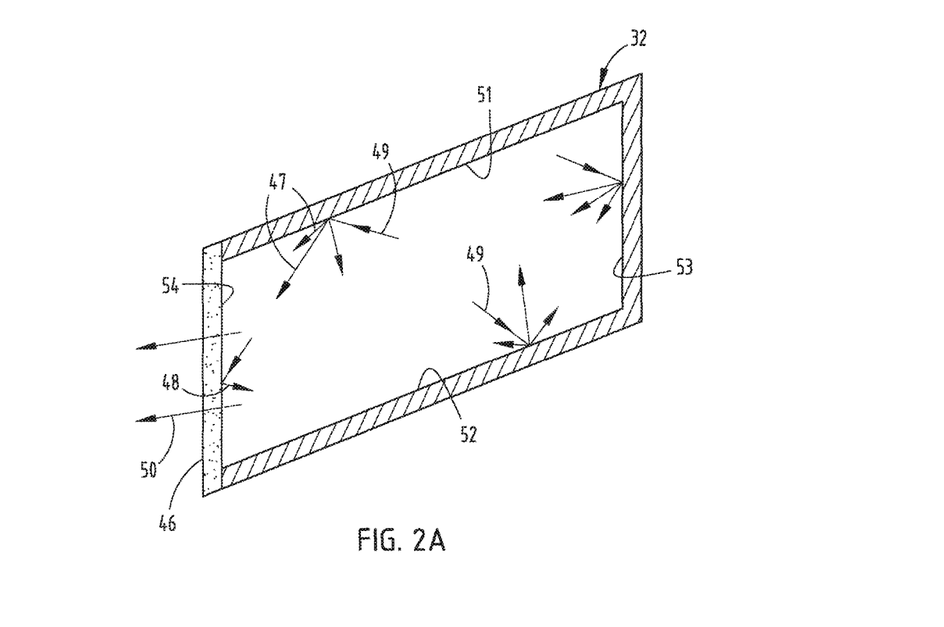
FIG. 2A is a cross-sectional view of the light guide depicted in FIG. 2 at line IIA-IIA.

As shown in FIGS. 2 and 2A, a light guide 30 is depicted to provide uniform illumination for various lighting applications according to another aspect of the disclosure. Light guide 30 is a modified version of light guide 10 with common features and operation. Unless otherwise noted, light guide 30 includes the same or similar elements as light guide 10. For example, light guide 30 includes a light chamber 32 defined by isotropically luminant surfaces 51 (top), 52 (bottom) and 53 (back). Further, light chamber 32 is defined by a front surface 54 having a partially transmissive lens 46. Light chamber 32 can also enclose a substantially gaseous medium, for example, ambient air, in the same fashion as light chamber 2 (see FIG. 1). The light guide 30 also includes an LED light source 34 within the chamber 32, preferably located at one end of chamber 32 and oriented toward the other end.

FIGS. 2 and 2A demonstrate that there are two primary differences between light guides 10 and 30. First, light guide 30 does not include a reflective diaphragm element (see, e.g., reflective diaphragm 6 in FIG. 1). Second, light guide 30 relies on a partially transmissive lens 46 instead of a translucent lens (see, e.g., translucent lens 16 in FIG. 1). Here, the partially transmissive lens 46 has a light transmissivity of approximately 15 to 40% of the sum of incident light 49 form the LED light source 34 and scattered light 47 from the isotropically luminant surfaces 51, 52 and 53. Light chamber 32 can be further defined by a chamber length 43, spanning the longest axis of the chamber, and a right end 41 and a left end 42. Light chamber 32 may also possess a substantially constant cross-sectional area across the chamber length 43. Light chamber 32 could also be arranged in the shape of a rectangular cuboid with opposed, parallel ends 41 and 42. Still further, chamber 32 can possess other shapes, configurations, and cross-sectional areas as described earlier in this disclosure in connection with chamber 2 (see FIG. 1).

Referring to FIGS. 2 and 2A, light guide 30 operates to produce a substantially uniform transmitted light pattern over the length 43 of the chamber 32. In particular, LED light source 34 produces incident light rays 49 within the chamber 32. A portion of these incident light rays 49 strike partially transmissive lens 46, and continue to propagate within chamber 32 as reflected light rays 48. Another portion of the incident light rays 49 strike the isotropically luminant surfaces 51, 52 and 53 within chamber 32. These light rays 49 are then scattered in many directions from surfaces 51, 52 and 53 as scattered light rays 47. In turn, some of these scattered light rays 47 are reflected off of partially transmissive lens 46 as additional reflected light rays 48. Eventually, a portion of the incident light rays 49, reflected light rays 48, and scattered light rays 47 pass and/or leak through partially transmissive lens 46 along the length 43 of chamber 32. These "leaked" rays then pass out of partially transmissive lens 46 as transmitted light rays 50. Together, all of the transmitted light rays 50 that leak through the partially transmissive lens 46 create a highly uniform light pattern emanating from light guide 30.

Figure 3:
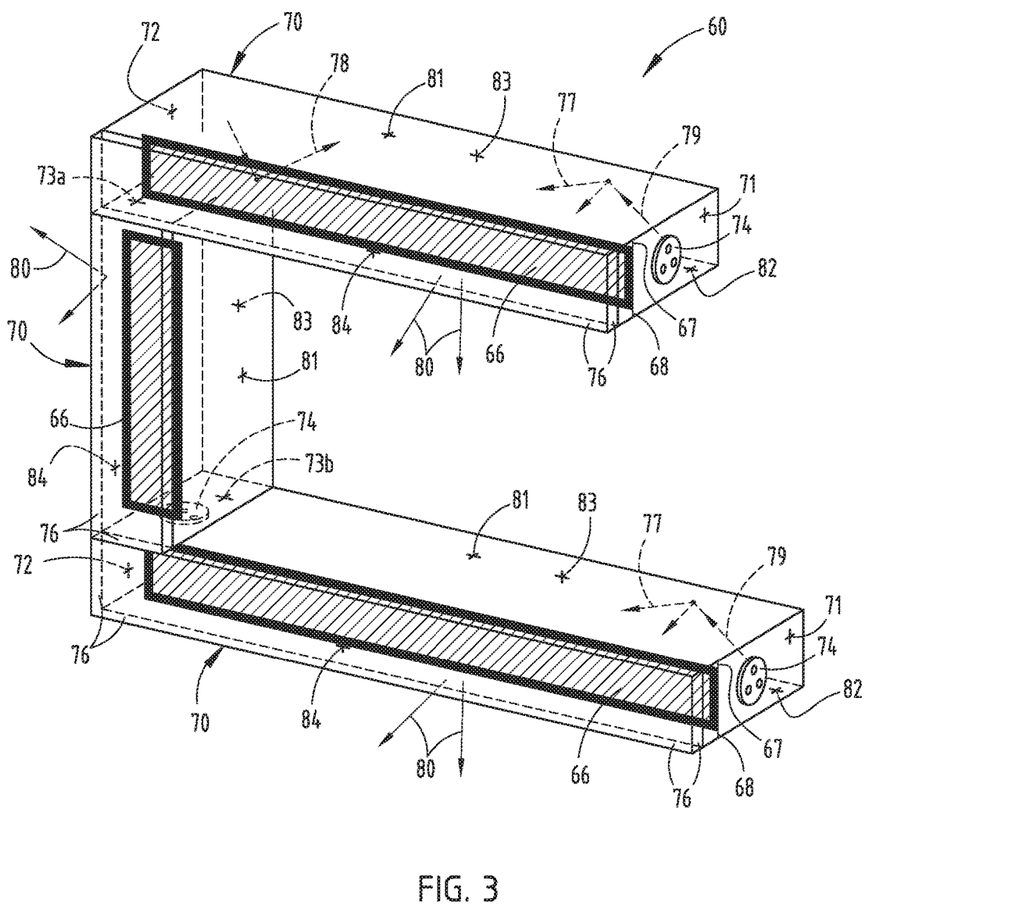
FIG. 3 is a perspective view of a vehicle lighting assembly with interconnected light chamber sections that are each illuminated by an LED light source, defined by isotropically luminant surfaces, and include a reflective diaphragm and a translucent lens according to a further aspect of the disclosure.
Figure 4:
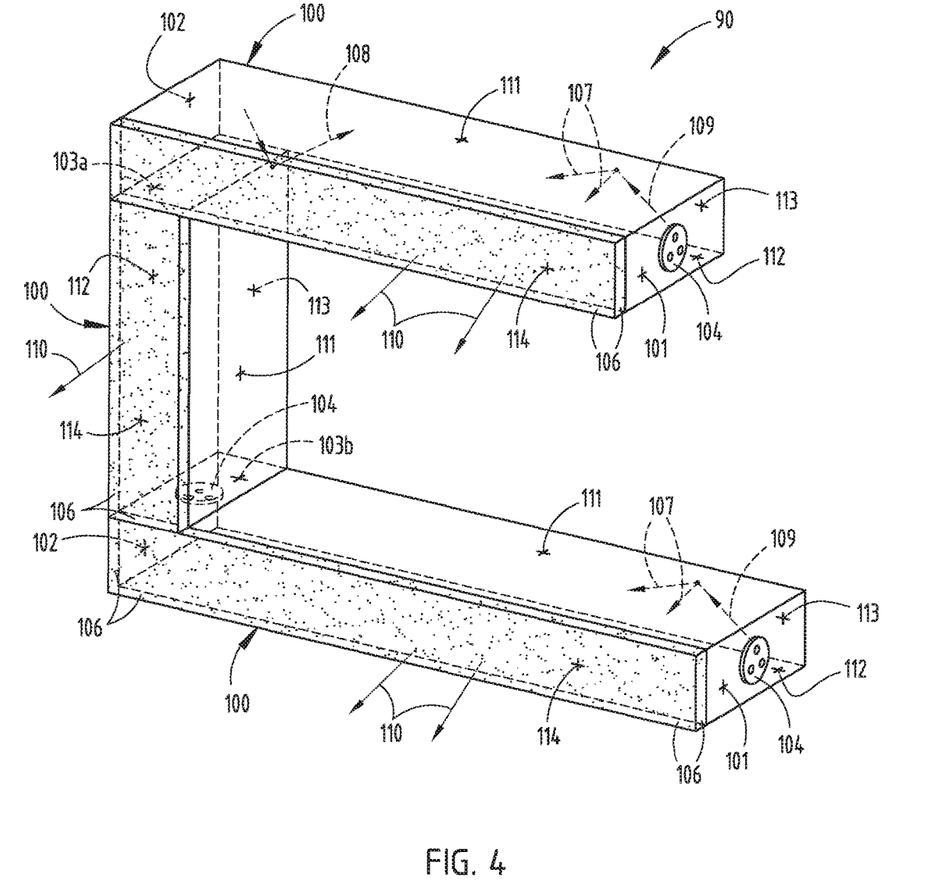
FIG. 4 is a perspective view of a vehicle lighting assembly with interconnected light chamber sections that are each illuminated by an LED light source, defined by isotropically luminant surfaces, and include a partially transmissive lens according to an additional aspect of the disclosure.

As shown in FIGS. 3 and 4, light chamber sections comparable to light guides 10 and 30 (see FIGS. 1, 1A, 2, 2A), may be employed in vehicle lighting assemblies 60 (FIGS. 3) and 90 (FIG. 4) according to other aspects of the disclosure. In particular, as shown in FIG. 3, vehicle lighting assembly 60 can include three interconnected light chamber sections 70, arranged in a stylized vehicle tail-light configuration. Light chamber sections 70 are comparable in configuration and function to light guides 10 and light chamber 2 (see FIG. 1). Each light chamber section 70 is defined by a front surface 84 having a translucent lens element 76, along with isotropically luminant top, bottom and back surfaces 81, 82 and 83, respectively. Further, each light chamber section 70 includes an LED light source 74. As shown in FIG. 3, the sections 70 spanning in the horizontal direction from left to right include right and left ends 71 and 72, respectively. For its part, the section 70 arranged in the vertical direction includes top end 73a and bottom end 73b. Each chamber section 70 may also be defined by a substantially constant cross-sectional area across its length. Nevertheless, each chamber section 70 (and thus vehicle lighting assembly 60) can possess a variety of other shapes, comparable to the spectrum of configurations available for light chamber 2 (see FIG. 1).

Each section 70 further includes a reflective diaphragm 66, arranged within its confines. In particular, reflective diaphragm 66 is arranged within the section such that it defines a top gap 67 between its top edge and top surface 82. Further, reflective diaphragm 66 is arranged within the section 70 such that it also defines a bottom gap 68 between its bottom edge and bottom surface 82. Accordingly, there is a pair of gaps 67 and 68 within each section 70, one on each side of the reflective diaphragm 66.

Vehicle lighting assembly 60 operates according to the following guidelines and fundamentals. Initially, LED light source 74 in each section 70 emanates incident light rays 79. A portion of these incident light rays 79 strike reflective diaphragm 66, and continue to propagate within the section 70 as reflected light rays 78. Another portion of the incident light rays 79 strike the isotropically luminant surfaces 81, 82 and 83 within section 70. These light rays 79 are then scattered in all (or nearly all) directions from the isotropically luminant surfaces as scattered light rays 77. In turn, many of these scattered light rays 77 are reflected off of reflective diaphragm 66 as reflected light rays 78. Ultimately, incident light rays 79, reflected light rays 78, and scattered light rays 77 pass and/or leak through gaps 67 and 68 along the edge of reflective diaphragm 66. These "leaked" rays then pass out of lens 76 along the section 70 as transmitted light rays 80. Together, all of the transmitted light rays 80 that leak through the gaps 67 and 68 and exit the section 70 through lens 76 create a highly uniform light pattern. Collectively, the transmitted light rays 80 from each section 70 provide a highly uniform light pattern that emanates from the vehicle lighting assembly 60.

As described earlier in connection with light chamber 2 (see FIG. 1), it is also preferable within each section 70 to control the dimensions of the top and bottom gaps 67 and 68 between diaphragm 66 and the top and bottom surfaces 81 and 82, respectively. One approach is to arrange the gaps 67 and 68 such that their total length relative to the distance between top and bottom surfaces 81 and 82 exists in a ratio in the range of approximately 1:4 to 1:9. For example, this ratio is 1:4 when the top and bottom gaps are each set at 0.5 cm and the distance between the top and bottom surfaces 81 and 82 is 4 cm. It is also preferable to control the size of gaps 67 and 68 such they are roughly equal to one another.

Referring to FIG. 4, vehicle lighting assembly 90 includes three interconnected light chamber sections 100, arranged in a stylized vehicle tail-light configuration. Light chamber sections 100 are comparable in configuration and function to light guides 30 (see FIG. 2). Each light chamber section 100 is defined by a front surface 114 having a partially transmissive lens element 106, along with isotropically luminant top, bottom and back surfaces 111, 112 and 113, respectively. Further, each light chamber section 100 includes an LED light source 104. As shown in FIG. 4, the sections 100 spanning from left to right in the horizontal direction include right and left ends 101 and 102, respectively. In addition, the section 100 arranged in the vertical direction includes top end 103a and bottom end 103b. Each chamber section 100 may also be defined by a substantially constant cross-sectional area across its length. In addition, each chamber section 100 could also possess a variety of other shapes and configurations, comparable to the universe of configurations available for light chamber 32 (see FIG. 2). Accordingly, vehicle lighting assembly 90 also possesses significant shape flexibility.

Each light chamber section 100 operates to produce a substantially uniform transmitted light pattern over the length the section. In particular, LED light source 104 produces incident light rays 109. A portion of these incident light rays 109 strike partially transmissive lens 106, and continue to propagate within the section 100 as reflected light rays 108. Another portion of the incident light rays 109 strike the isotropically luminant surfaces 111, 112 and 113 within the section 100. These light rays 109 are then scattered in many directions from these isotropically luminant surfaces as scattered light rays 107. In turn, some of these scattered light rays 107 are reflected off of partially transmissive lens 106 as additional reflected light rays 108. Here, the partially transmissive lens 106 may have a light transmissivity of approximately 15 to 40% of the sum of incident light 109 form the LED light source 104 and scattered light 107 from the isotropically luminant surfaces 111, 112 and 113.

Eventually, a portion of the incident light rays 109, reflected light rays 108, and scattered light rays 107 pass and/or leak through partially transmissive lens 106 along the length of section 100. These "leaked" rays then pass out of partially transmissive lens 106 as transmitted light rays 50. Together, all of the transmitted light rays 110 that leak through the partially transmissive lens 106 create a highly uniform light pattern emanating from each section 100. Collectively, the transmitted light rays 110 from each section 100 provide a highly uniform light pattern that emanates from the vehicle lighting assembly 90.

As demonstrated by FIGS. 3 and 4, light chamber sections 70 and 100 can be interconnected in various ways to create assemblies, such as vehicle lighting assemblies 60 and 90. In addition, combinations of any number of sections 70 and 100 can be arranged together to form an assembly comparable to assemblies 60 or 90. Each section (e.g., sections 70 and 100) should have its own LED light source (e.g., LED light sources 74 and 104). Nevertheless, isolation of the interconnected sections 70 and/or 100 is not required. In other words, incident light rays 79 or 109 from one LED light source 74 or 104 within one section may emanate, scatter, reflect and otherwise propagate within other interconnected sections. Ultimately, the sections 70 and 100 can be configured in various shapes, as described earlier, and then interconnected in various ways to create the desired lighting assembly shapes and configurations.

Light guides 10 and 30, vehicle lighting assemblies 60 and 90, and derivatives of these guides and assemblies, may be used in various vehicular and non-vehicular lighting applications. For example, light guides 10 and 30 may be employed in vehicle tail-light assemblies (comparable to assemblies 60 and 90) to generate highly uniform illumination with significant flexibility in chamber design and manufacturability. Other vehicular applications for light guides 10 and 30 include illuminated sill-plates, puddle lamps, and cabin lights. Light guides 10 and 30, along with assemblies comparable to vehicle lighting assemblies 60 and 90, may also be employed in other household applications requiring uniform light output and design flexibility. For example, these light guides and assemblies could be used for interior, recessed lighting for stylistic effects. Other applications for these light guides and assemblies include lighting for toys and other consumer goods requiring significant shape flexibility and uniform illumination.

These light guides and assemblies offer many advantages over conventional light guide approaches. For example, they can be employed in configurations with relatively thin walls, thus providing improved manufacturability. The light production efficiencies of these guides and assemblies are comparable to and can exceed conventional light pipe configurations. The illumination pattern of these light guides and assemblies is also more uniform than their conventional counterparts. Finally, it is relatively easy to add or subtract LED light sources within the foregoing light chambers and sections—another aspect of improved manufacturability.

Variations and modifications can be made to the aforementioned structures without departing from the concepts of the present disclosure. Further, such concepts are intended to be covered by the following claims unless these claims by their language expressly state otherwise.

We claim:

1. A light guide, comprising:
a chamber comprising opposed side ends, isotropic light-scattering upper and lower interior surfaces and a front lens normal to the side ends;
a reflective diaphragm comprising metal constituents within the chamber spaced from the lens and both of the surfaces; and
an LED light source within the chamber, spaced behind the diaphragm at a side end,
wherein a ratio of gaps between the diaphragm and the surfaces to a distance between the surfaces is 1:4 to 1:9.

2. The light guide according to claim 1, wherein the diaphragm is spaced from the lens, about one third of the distance between the lens and a back interior surface of the chamber.

3. The light guide according to claim 1, wherein the LED light source is arranged to direct incident light toward the isotropic light-scattering interior surfaces.

4. The light guide according to claim 1, wherein the chamber is defined by a varying cross-sectional area.

5. The light guide according to claim 1, wherein the reflective diaphragm is a mirror-like element comprising a metal.

6. The light guide according to claim 1, wherein the isotropic light-scattering interior surfaces are characterized by a reflectance of 96% or greater.

7. The light guide according to claim 1, wherein the chamber is arranged in a vehicular tail-light configuration.

8. A light guide, comprising:
a cylindrical chamber defined by opposed ends, isotropic light-scattering interior surfaces and a front lens;
a reflective diaphragm comprising metal constituents within the chamber spaced from the lens and portions of the interior surfaces near the lens; and
an LED light source within the chamber, spaced behind the diaphragm,
wherein a ratio of gaps between the diaphragm and the portions to a distance between the portions is 1:4 to 1:9.

9. The light guide according to claim 8, wherein the diaphragm is spaced from the lens, about one third of the distance between the lens and a back interior surface of the chamber.

10. The light guide according to claim 8, wherein the LED light source is arranged to direct incident light toward the isotropic light-scattering interior surfaces.

11. The light guide according to claim 8, wherein the reflective diaphragm is a mirror-like element comprising a metal.

12. The light guide according to claim 8, wherein the isotropic light-scattering interior surfaces are characterized by a reflectance of 96% or greater.

13. The light guide according to claim 8, wherein the chamber is arranged in a vehicular tail-light configuration.

* * * * *